United States Patent
Line et al.

(10) Patent No.: US 10,989,242 B2
(45) Date of Patent: Apr. 27, 2021

(54) VEHICLE SEATING CUSHION WITH SNAP-FIT FASTENERS TO INTERCONNECT WITH SNAP-FIT RECEIVERS ON A STRUCTURAL SUPPORT

(71) Applicant: Ford Global Technologies, LLC, Dearborn, MI (US)

(72) Inventors: Johnathan Andrew Line, Northville, MI (US); Christian J. Hosbach, Pittsburgh, PA (US); Corbin Shea Johnston, Winnipeg (CA); Spencer Robert Hoernke, Dundas (CA); Kevin Mozurkewich, Milford, MI (US); Andrew Matusko, Dexter, MI (US); Brian M. Thiel, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/837,235

(22) Filed: Apr. 1, 2020

(65) Prior Publication Data
US 2020/0224699 A1   Jul. 16, 2020

Related U.S. Application Data

(62) Division of application No. 16/577,391, filed on Sep. 20, 2019, which is a division of application No.
(Continued)

(51) Int. Cl.
*F16B 21/08* (2006.01)
*B60N 2/64* (2006.01)
(Continued)

(52) U.S. Cl.
CPC .............. *F16B 21/088* (2013.01); *B60N 2/64* (2013.01); *B60N 2/682* (2013.01); *B60N 2/70* (2013.01); *F16B 2/22* (2013.01)

(58) Field of Classification Search
CPC .. B60N 2/64; B60N 2/682; B60N 2/70; F16B 2/22; F16B 21/088
See application file for complete search history.

(56) References Cited

U.S. PATENT DOCUMENTS 3,630,572 A * 12/1971 Homier ..................... A47C 7/18
297/452.6
3,861,747 A * 1/1975 Diamond ............... A47C 7/024
297/452.49

(Continued)

*Primary Examiner* — James M Ference
(74) *Attorney, Agent, or Firm* — David Coppiellie; Price Heneveld LLP

(57) ABSTRACT

A seating assembly for a vehicle comprises: a cushion comprising an outer edge and a plurality of snap-fit-fasteners; and a carrier comprising an outer edge surface and a plurality of snap-fit receivers near the outer edge surface of the carrier arranged to receive the plurality of snap-fit fasteners; wherein the plurality of snap-fit receivers have received and are retaining the plurality of snap-fit fasteners such that the cushion is interconnected with the carrier; and wherein the plurality of snap-fit fasteners and plurality of receivers are arranged to prevent the edge of the cushion from rolling up. The cushion further comprises a lip having an inward facing surface; wherein the cushion at least partially surrounds the carrier with at least a portion of the inward facing surface of the lip facing the outer edge surface of the carrier.

20 Claims, 19 Drawing Sheets

Related U.S. Application Data

15/605,238, filed on May 25, 2017, now Pat. No. 10,473,136.

(51) Int. Cl.
*F16B 2/22* (2006.01)
*B60N 2/70* (2006.01)
*B60N 2/68* (2006.01)

(56) References Cited

U.S. PATENT DOCUMENTS

| | | | | |
|---|---|---|---|---|
| 4,579,389 A * | 4/1986 | Shimbori | A47C 7/18 | 297/452.6 |
| 4,606,580 A * | 8/1986 | Yoshizawa | B60N 2/5825 | 297/452.6 |
| 4,643,480 A * | 2/1987 | Morita | B60N 2/70 | 297/226 |
| 4,865,383 A * | 9/1989 | Sbaragli | B60N 2/5825 | 297/218.2 |
| 5,401,075 A * | 3/1995 | Venuto | A47C 31/023 | 297/218.2 |
| 5,605,373 A * | 2/1997 | Wildern, IV | B60N 2/5825 | 297/218.3 |
| 5,733,001 A * | 3/1998 | Roberts | B60N 2/5825 | 24/297 |
| 5,820,213 A * | 10/1998 | Severinski | A47C 31/023 | 297/218.5 |
| 5,826,312 A * | 10/1998 | Schroder | B60N 2/5825 | 24/601.2 |
| 6,106,071 A * | 8/2000 | Aebischer | B60N 2/686 | 297/452.18 |
| 6,220,661 B1 * | 4/2001 | Peterson | A47C 7/24 | 297/218.4 |
| 6,241,188 B1 * | 6/2001 | Simpson | B60N 2/6027 | 244/122 R |
| 6,394,546 B1 * | 5/2002 | Knoblock | A47C 1/023 | 297/284.4 |
| 6,425,637 B1 * | 7/2002 | Peterson | A47C 7/24 | 297/452.3 |
| 6,499,801 B1 * | 12/2002 | Peterson | A47C 31/001 | 297/219.1 |
| 6,726,278 B1 * | 4/2004 | Albright | A47C 3/18 | 297/218.1 |
| 6,964,453 B1 * | 11/2005 | Flegal | B60N 2/5825 | 297/452.6 |
| 7,287,305 B2 * | 10/2007 | Bednarski | B60N 2/5825 | 24/297 |
| 7,419,221 B2 * | 9/2008 | Fisher | A47C 1/12 | 297/440.2 |
| 7,481,489 B2 * | 1/2009 | Demick | B60N 2/5825 | 297/218.1 |
| 7,490,392 B2 * | 2/2009 | Peterson | A47C 7/185 | 29/446 |
| 7,490,395 B2 * | 2/2009 | Coffield | A47C 31/026 | 29/432 |
| 7,585,025 B2 * | 9/2009 | Welch | B60N 2/809 | 297/218.2 |
| 7,891,735 B2 * | 2/2011 | Oku | B60N 2/6009 | 297/218.3 |
| 7,901,002 B2 * | 3/2011 | Mashimo | B60N 2/5825 | 297/218.3 |
| 7,946,649 B2 | 5/2011 | Galbreath et al. | | |
| 8,157,324 B2 * | 4/2012 | Matsuzaki | B60N 2/5816 | 297/218.1 |
| 8,696,066 B2 * | 4/2014 | Mizobata | B60N 2/682 | 297/440.11 |
| 8,973,990 B2 * | 3/2015 | Krupiczewicz | A47C 31/02 | 297/218.1 |
| 8,979,195 B2 * | 3/2015 | Itakura | B60N 2/6027 | 297/218.2 |
| 8,985,685 B2 * | 3/2015 | Line | B60R 7/043 | 297/188.04 |
| 9,180,804 B2 * | 11/2015 | Tsunoda | B60N 2/5825 | |
| 9,555,728 B2 * | 1/2017 | Galbreath | A01K 1/0272 | |
| 2002/0050734 A1 * | 5/2002 | Takezawa | B60N 2/5883 | 297/452.58 |
| 2002/0074845 A1 * | 6/2002 | Perske | B60N 2/5825 | 297/452.6 |
| 2002/0101109 A1 * | 8/2002 | Stiller | B60N 2/5825 | 297/452.6 |
| 2002/0117882 A1 * | 8/2002 | Takezawa | B60N 2/5825 | 297/218.1 |
| 2003/0001421 A1 * | 1/2003 | Schmidt | B60N 2/5825 | 297/452.6 |
| 2003/0042773 A1 * | 3/2003 | Stiller | B60N 2/5816 | 297/218.3 |
| 2005/0150090 A1 * | 7/2005 | Pedde | F16B 5/0692 | 24/698.1 |
| 2006/0214485 A1 * | 9/2006 | Brockschnieder | B60N 2/5825 | 297/228.11 |
| 2006/0237986 A1 * | 10/2006 | Brockschneider | B60N 2/5825 | 296/65.09 |
| 2007/0011853 A1 * | 1/2007 | Smith | B60N 2/5841 | 24/545 |
| 2007/0069559 A1 * | 3/2007 | Poulakis | B60N 2/5825 | 297/218.2 |
| 2008/0258523 A1 * | 10/2008 | Santin | B60N 2/5825 | 297/218.2 |
| 2009/0033131 A1 * | 2/2009 | Clauser | B60N 2/5825 | 297/218.4 |
| 2009/0064471 A1 * | 3/2009 | Santin | B60N 2/5825 | 24/581.11 |
| 2009/0085384 A1 * | 4/2009 | Galbreath | B60N 2/5825 | 297/218.1 |
| 2009/0102270 A1 * | 4/2009 | Wissner | B60N 2/7094 | 297/452.56 |
| 2010/0148546 A1 * | 6/2010 | Demontis | B60N 2/6671 | 297/216.13 |
| 2010/0171346 A1 * | 7/2010 | Laframboise | B29C 66/727 | 297/183.1 |
| 2014/0084661 A1 * | 3/2014 | Awata | B60N 2/68 | 297/452.18 |
| 2014/0203603 A1 * | 7/2014 | Line | B60N 2/986 | 297/218.1 |
| 2014/0203610 A1 * | 7/2014 | Line | B60N 2/0232 | 297/354.1 |
| 2015/0008716 A1 * | 1/2015 | Dry | B60N 2/68 | 297/452.18 |
| 2015/0145303 A1 * | 5/2015 | Line | B60N 2/02 | 297/283.3 |
| 2015/0283970 A1 * | 10/2015 | Line | B60N 2/58 | 280/728.3 |
| 2016/0068089 A1 * | 3/2016 | Huebner | B60N 2/6063 | 297/228.13 |
| 2016/0096448 A1 * | 4/2016 | Line | B60N 2/0224 | 297/354.11 |
| 2016/0096449 A1 * | 4/2016 | Line | B60N 2/2222 | 297/354.11 |
| 2016/0096450 A1 * | 4/2016 | Kondrad | B60N 2/2222 | 297/285 |
| 2016/0207433 A1 * | 7/2016 | Kondrad | B60N 2/62 | |
| 2016/0229322 A1 * | 8/2016 | Line | B60N 2/682 | |
| 2016/0311367 A1 * | 10/2016 | Line | B60Q 3/233 | |
| 2016/0347224 A1 * | 12/2016 | Line | B60N 2/5657 | |
| 2017/0036577 A1 * | 2/2017 | Line | B60N 2/64 | |
| 2017/0036579 A1 * | 2/2017 | Line | B60N 2/809 | |
| 2017/0203709 A1 * | 7/2017 | Line | B60R 21/215 | |
| 2017/0355290 A1 * | 12/2017 | Line | B60N 2/643 | |
| 2017/0355291 A1 * | 12/2017 | Line | B60N 2/5825 | |
| 2017/0355292 A1 * | 12/2017 | Line | B60N 2/0232 | |
| 2018/0340563 A1 * | 11/2018 | Line | F16B 2/22 | |

* cited by examiner

VEHICLE SEATING CUSHION WITH SNAP-FIT FASTENERS TO INTERCONNECT WITH SNAP-FIT RECEIVERS ON A STRUCTURAL SUPPORT

CROSS-REFERENCE TO RELATED APPLICATION

This application is a divisional of and claims priority to U.S. patent application Ser. No. 16/577,391, filed on Sep. 20, 2019, and issued as U.S. Pat. No. 10,704,585 on Jul. 7, 2020, entitled "VEHICLE SEATING CUSHION WITH SNAP-FIT FASTENERS TO INTERCONNECT WITH SNAP-FIT RECEIVERS ON A STRUCTURAL SUPPORT," which is a divisional of and claims priority to U.S. patent application Ser. No. 15/605,238, filed on May 25, 2017, and issued as U.S. Pat. No. 10,473,136 on Nov. 12, 2019, entitled "VEHICLE SEATING CUSHION WITH SNAP-FIT FASTENERS TO INTERCONNECT WITH SNAP-FIT RECEIVERS ON A STRUCTURAL SUPPORT," the contents of which are relied upon and incorporated herein by reference in their entirety.

FIELD OF THE INVENTION

The present invention generally relates to the attachment of cushions onto a structural support for use as part of a vehicle seating assembly.

BACKGROUND OF THE INVENTION

A novel vehicle seating assembly utilizing a seatback including a carrier and a cushion assembly attached to the carrier was disclosed in U.S. patent application Ser. No. 15/414,659 (now U.S. Pat. No. 10,166,895), filed on Jan. 25, 2017, the entire disclosure of which is hereby incorporated by reference. The carrier provides structural support for the cushion assembly.

SUMMARY OF THE INVENTION

According to a first aspect of the present disclosure, a carrier for a cushion of a seating assembly of a vehicle comprises: a midline, an outer edge surface, a plurality of snap-fit receivers near the outer edge surface, and a rib contiguous with the outer edge surface; each of the plurality of snap-fit receivers comprising a cantilever deforming surface and a first catch receiving surface, and at least a portion of the plurality of the snap-fit receivers are arranged along the rib; each of the plurality of snap-fit receivers further comprising a crest having a tangent line and a cross-section width that widens between the crest and the first catch receiving surface; and an equal number of the plurality of snap-fit receivers is disposed to each side of the midline of the carrier, and one of the plurality of snap-fit receivers is disposed at the midline of the carrier.

According to a second aspect of the present disclosure, a carrier for a cushion of a seatback comfort assembly of a vehicle comprises: a cushion facing surface; a rib projecting forward from the cushion facing surface; and a plurality of snap-fit receivers, at least a portion of which are arranged along the rib.

Embodiments of the second aspect of the disclosure can include any one or a combination of the following features:
  the carrier further comprises an outer edge surface;
  the rib is contiguous with the outer edge surface;
  the carrier further comprises a midline;
  at least one of the plurality of snap-fit receivers is located at the midline;
  at least three of the plurality of snap-fit receivers are located to one side of the midline;
  at least three of the plurality of snap-fit receivers are located to another side of the midline;
  at least three of the plurality of snap-fit receivers that are located to the one side of the midline are arranged along the rib;
  at least three of the plurality of snap-fit receivers that are located to the another side of the midline are arranged along the rib;
  each of the plurality of snap-fit receivers includes a first catch receiving surface;
  each of the plurality of snap-fit receivers includes a second catch receiving surface;
  each of the plurality of snap-fit receivers includes a crest and a cross-section width that widens between the crest and the first catch receiving surface;
  each of the plurality of snap-fit receivers includes an elongated beam, circumnavigable around a cross-section thereof;
  the elongated beam has a length that is generally parallel to the outer edge surface;
  the rib is contiguous with the outer edge surface;
  the carrier further comprises an upper thoracic section and a lower lumbar section; and
  the cushion facing surface, the rib, and the plurality of snap-fit receivers are disposed at the upper thoracic section.

According to a third aspect of the present disclosure, a carrier for a cushion of seating assembly of a vehicle comprises: a plurality of snap-fit receivers, each of the plurality of snap-fit receivers further includes an elongated beam, circumnavigable around a cross-section thereof, the elongated beam including a crest, a first catch receiving surface, and a cross-section width that widens between the crest and the first catch receiving surface.

Embodiments of the third aspect of the disclosure can include any one or a combination of the following features:
  the carrier further comprises a cushion facing surface;
  the carrier comprises a rib projecting forward from the cushion facing surface;
  at least a portion of the plurality of snap-fit receivers are arranged along the rib;
  the carrier further comprises an outer edge surface;
  the rib is contiguous with the outer edge surface;
  the carrier further comprises a midline;
  at least three of the plurality of snap-fit receivers are located to one side of the midline; and
  at least three of the plurality of snap-fit receivers are located to another side of the midline.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
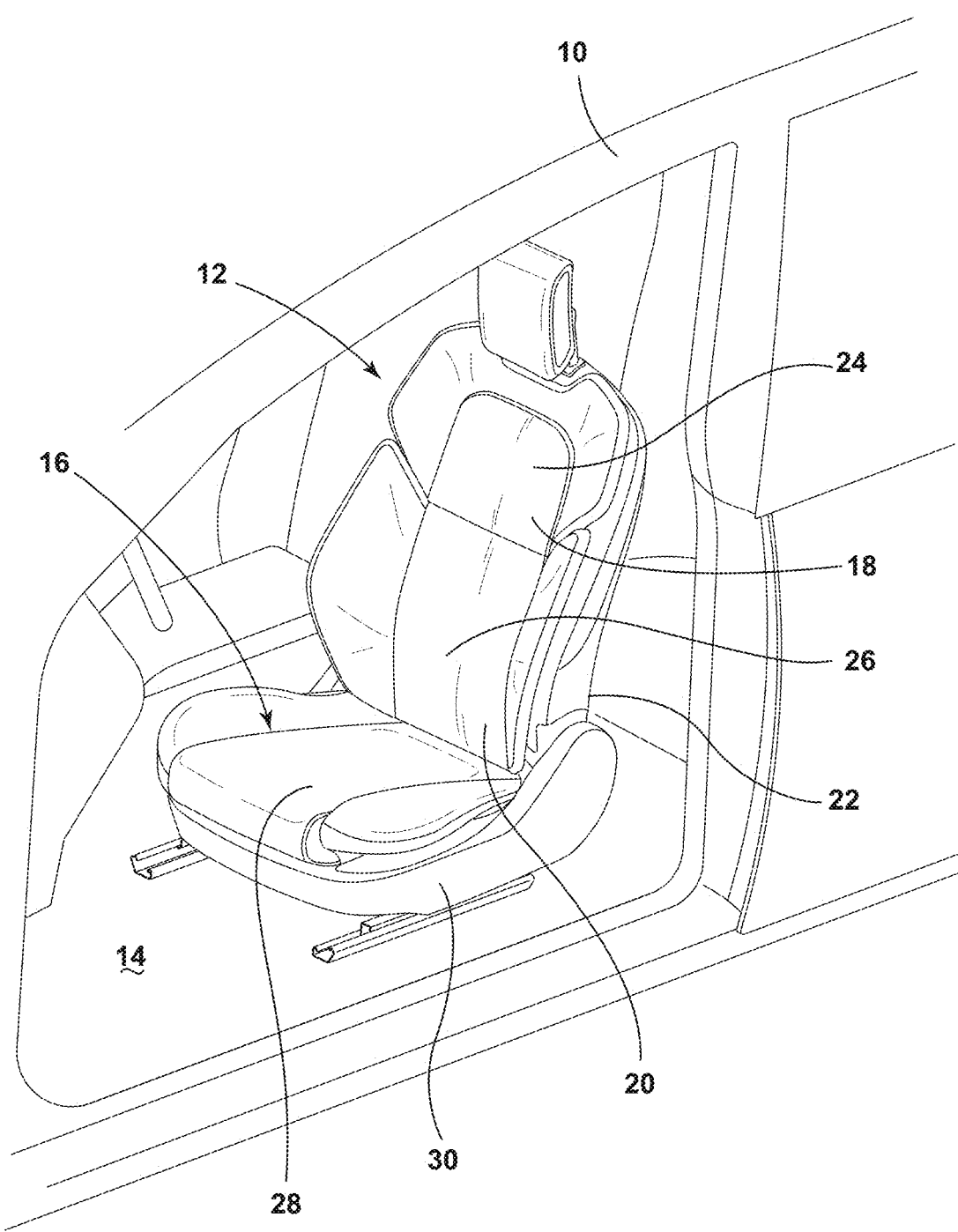
FIG. 1 is a perspective view of an interior of a vehicle illustrating a seating assembly.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, the interior of a vehicle 10 is illustrated. The vehicle 10 includes a seating assembly 12 interconnected with the floor 14. The seating assembly 12 includes a seat 16 and a seatback 18. The seatback 18 is generally adjustable relative to the seat 16. The seat 16 is generally adjustable relative to the floor 14. The seatback 18 is configured to support the back of an occupant of the seating assembly 12. The seatback 18 includes, among other things, a seatback comfort assembly 20 and a back panel 22. The seatback comfort assembly 20 can be divided into an upper thoracic region 24 and a lower lumbar region 26. The seat 16 includes a seat comfort assembly 28 attached to a seat frame 30. The vehicle 10 can be a car, truck, or van, among other things.

Figure 2:
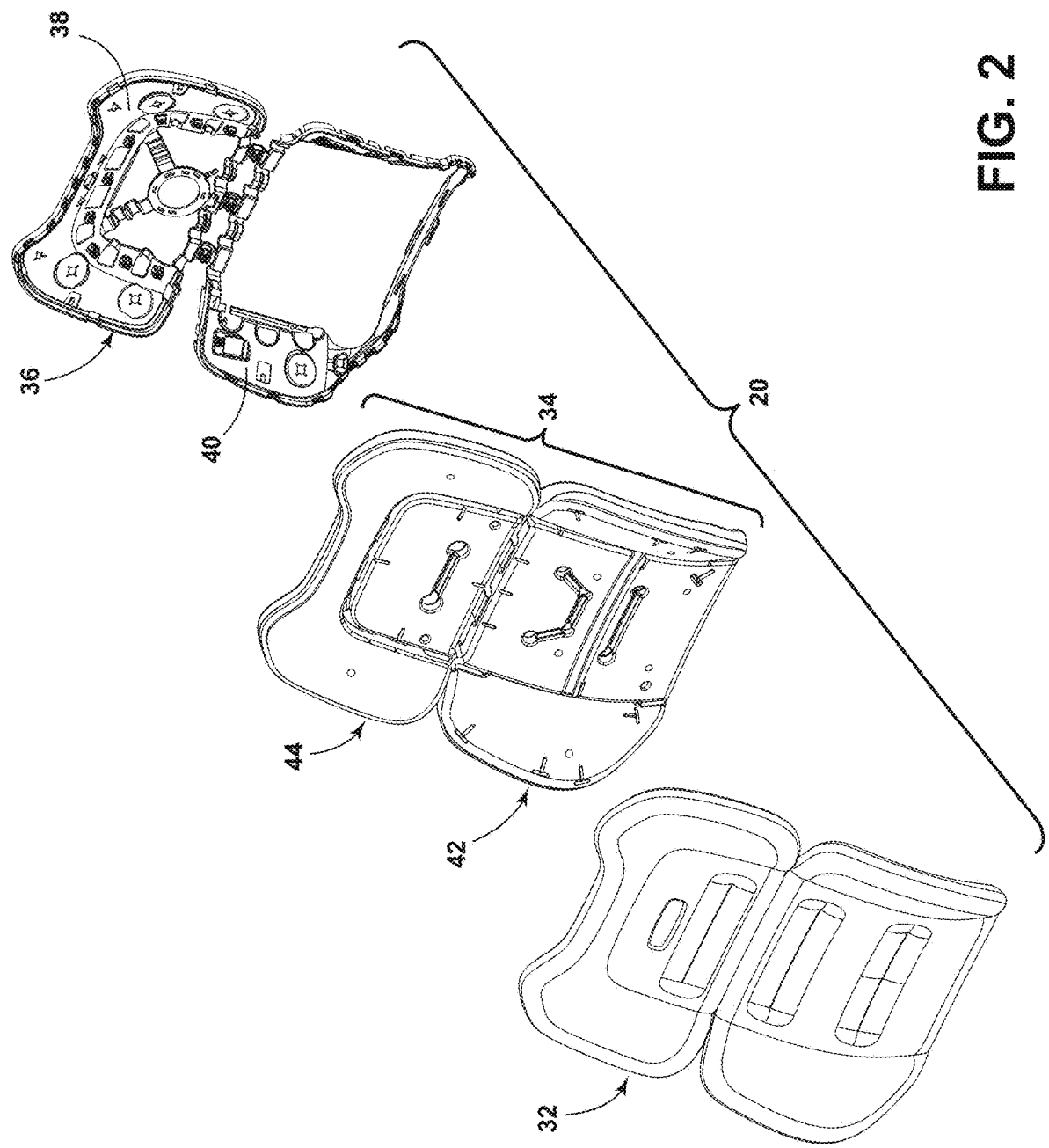
FIG. 2 is a perspective exploded view of a seatback comfort assembly for the seating assembly of FIG. 1, illustrating a cushion assembly attached to a carrier.
Figure 3:
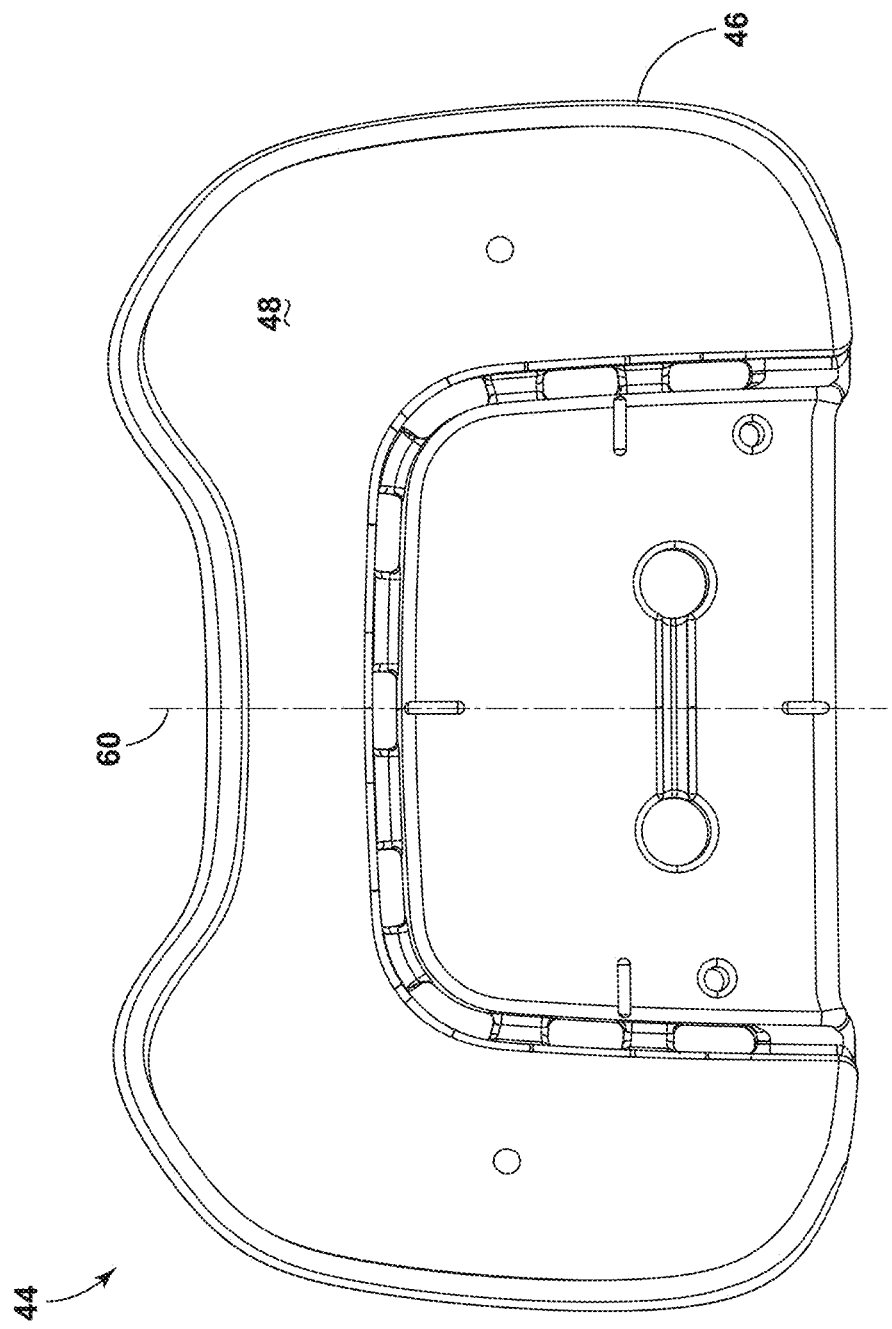
FIG. 3 is a front view of an upper thoracic component of the cushion assembly of FIG. 2, illustrating an occupant facing surface.
Figure 4:
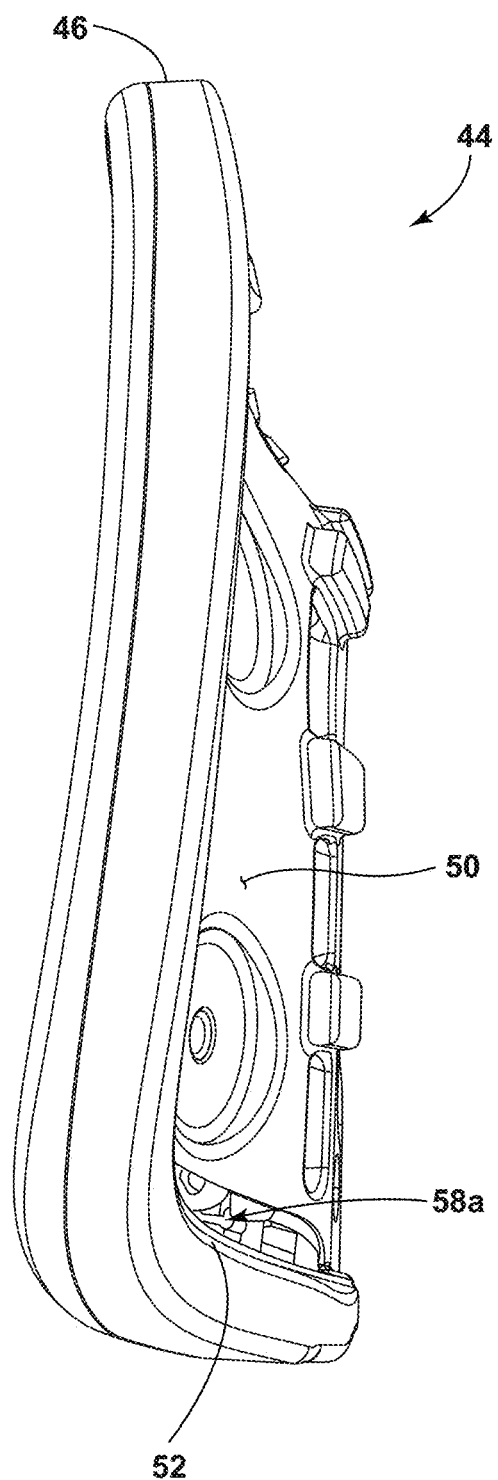
FIG. 4 is a side view of the upper thoracic component of FIG. 3, illustrating a lip that at least partially surrounds an upper thoracic section of the carrier, when the upper thoracic component is attached to the carrier.
Figure 5:
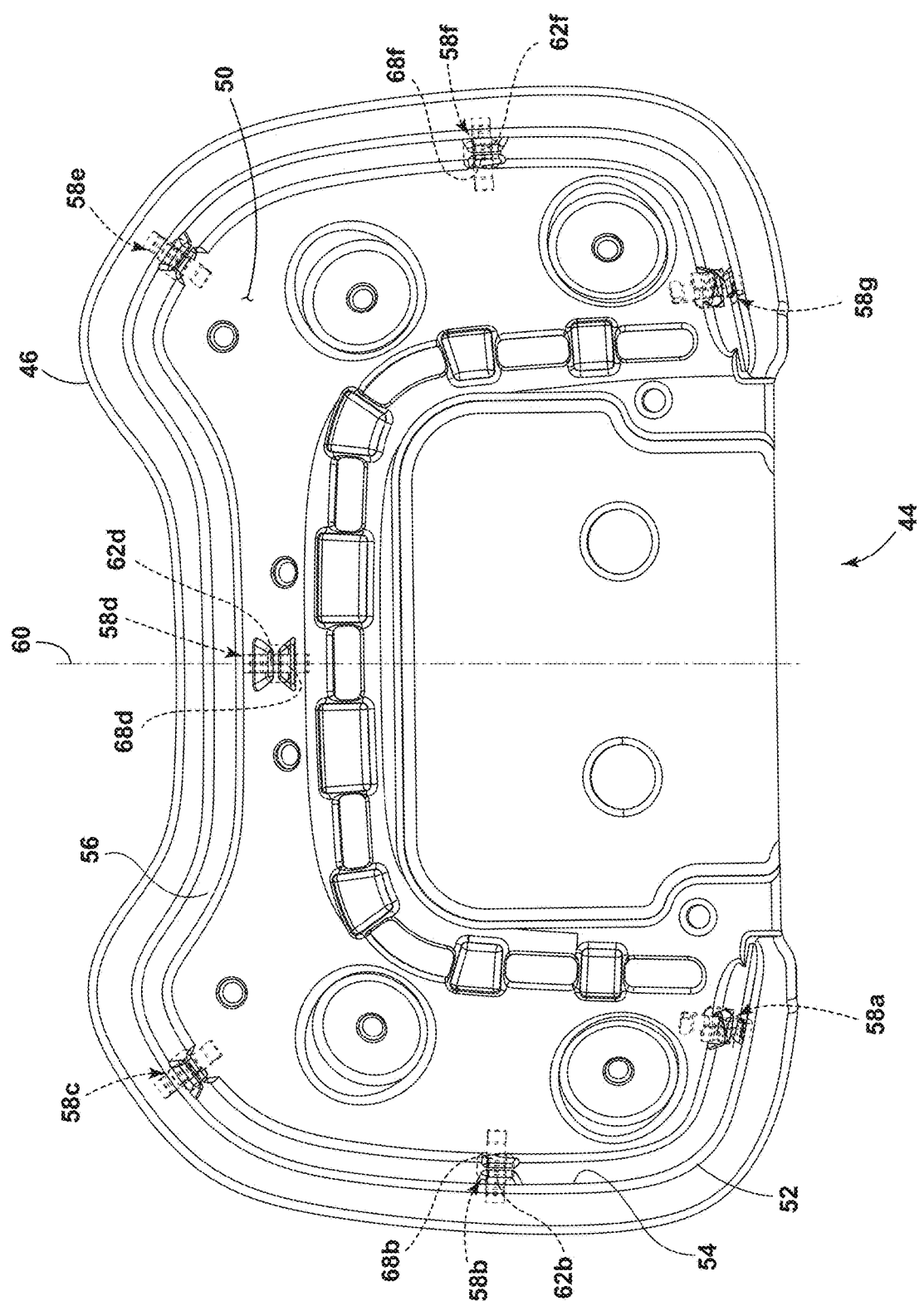
FIG. 5 is a rear view of the upper thoracic component of FIG. 3, illustrating a plurality of snap-fit fasteners arranged to connect the upper thoracic component to the carrier.
Figure 6:
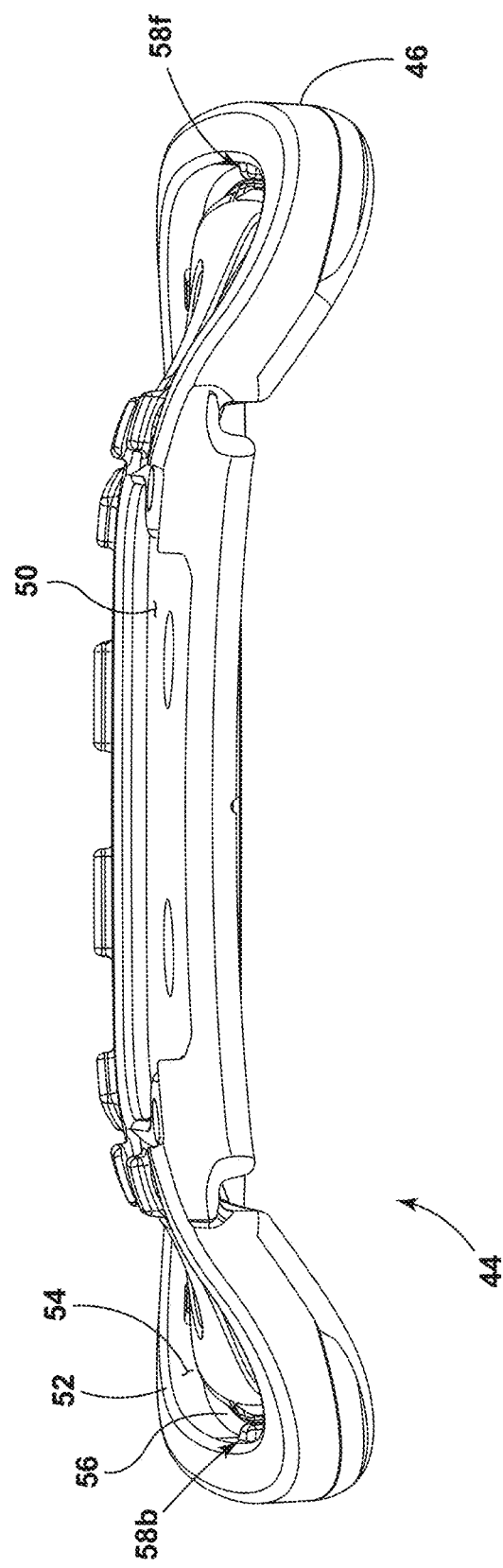
FIG. 6 is a bottom view of the upper thoracic component of FIG. 3, illustrating a recess adjacent the lip and at least a portion of the plurality of snap-fit fasteners arranged adjacent the lip.
Figure 7:
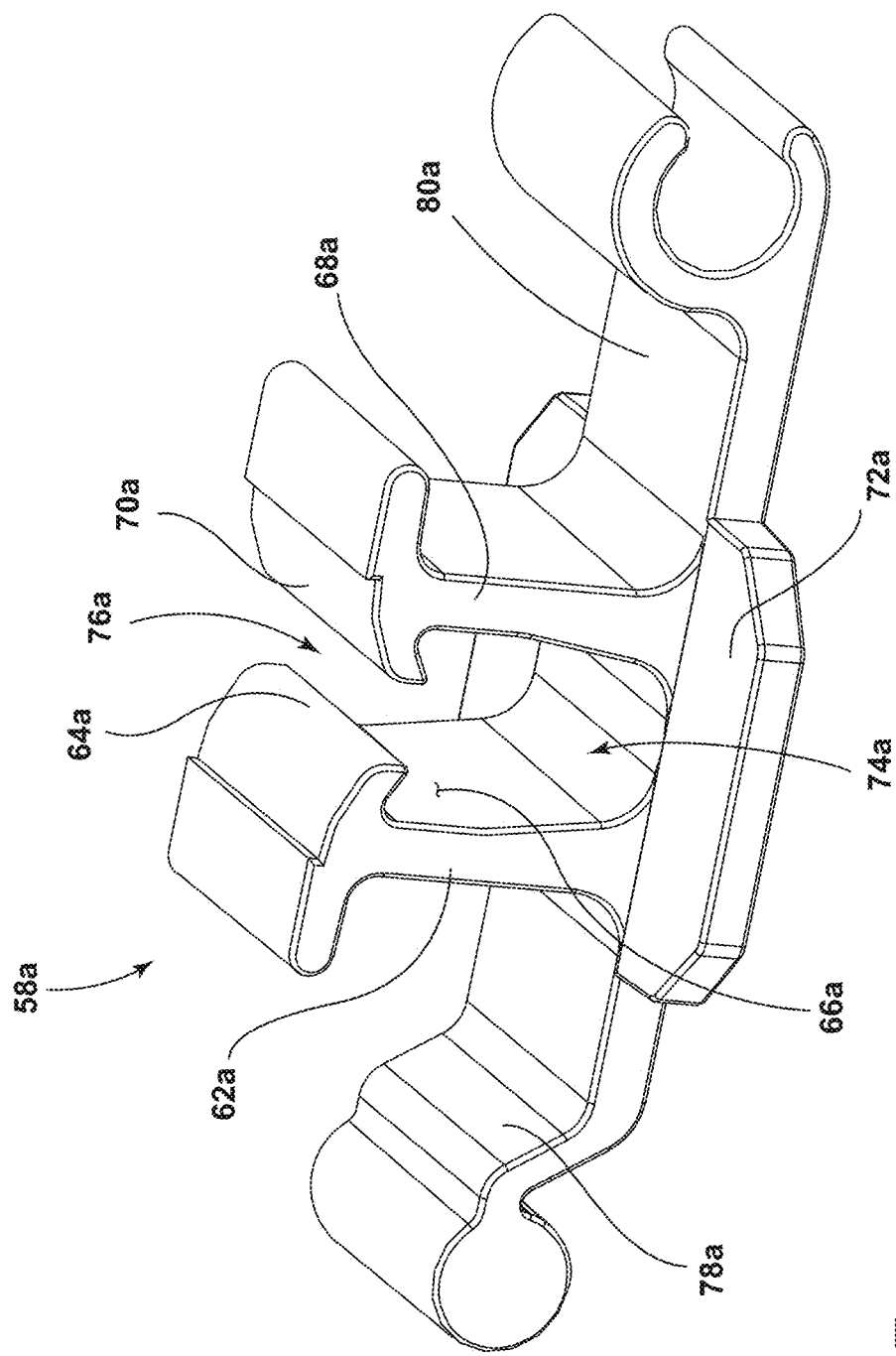
FIG. 7 is a perspective view of a representative snap-fit fastener of the plurality of snap-fit fasteners of FIG. 5, illustrating a first cantilever opposing a second cantilever.
Figure 8:
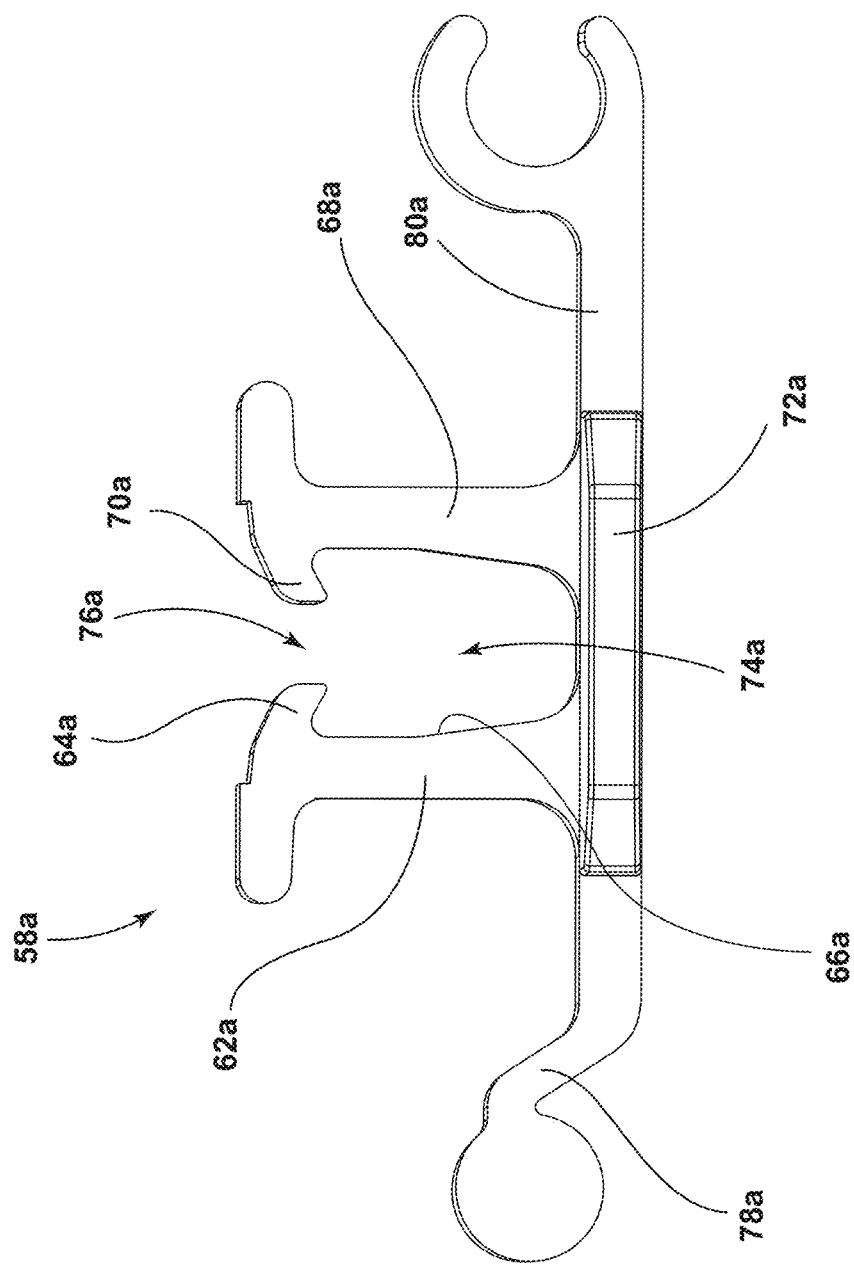
FIG. 8 is a side view of the representative snap-fit fastener of the plurality of snap-fit fasteners of FIG. 5, illustrating an opening into a receiver channel.
Figure 9:
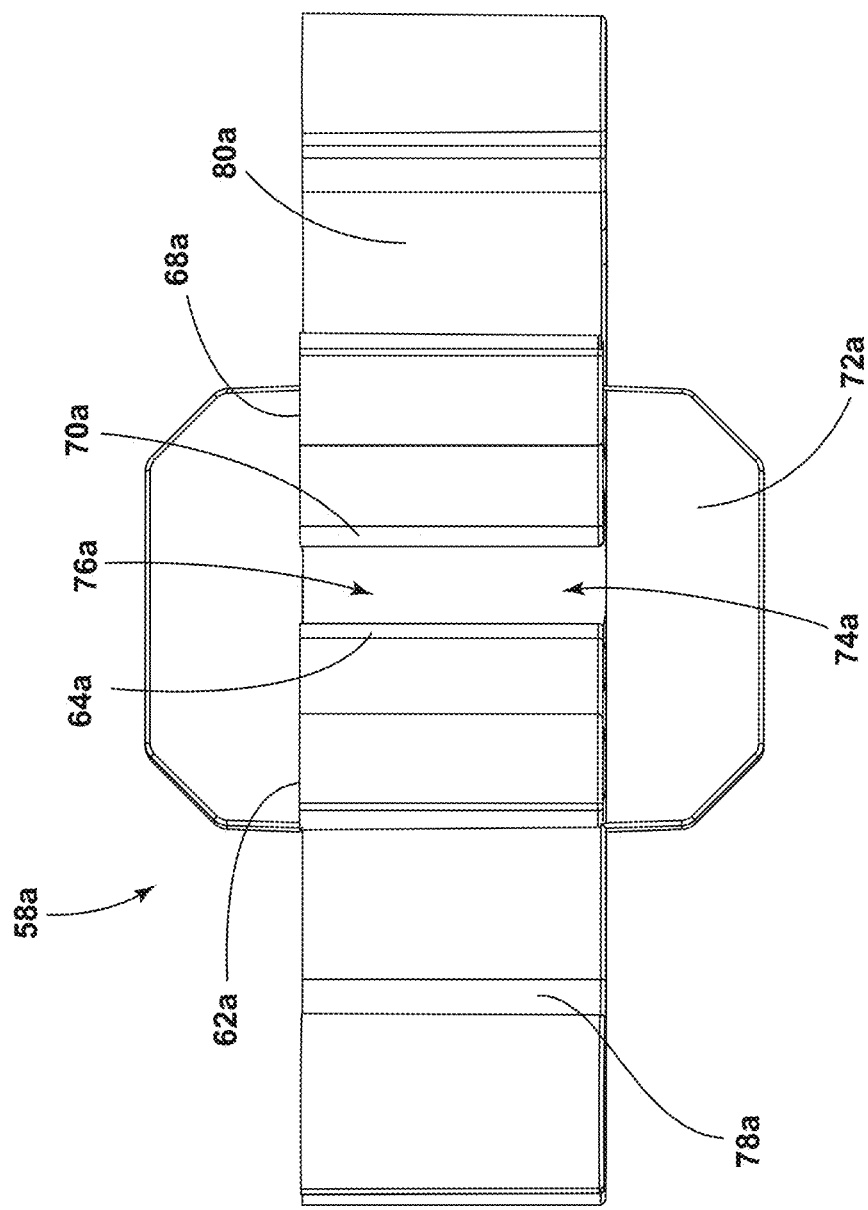
FIG. 9 is a top view of the representative snap-fit fastener of the plurality of snap-fit fasteners of FIG. 5.
Figure 10:
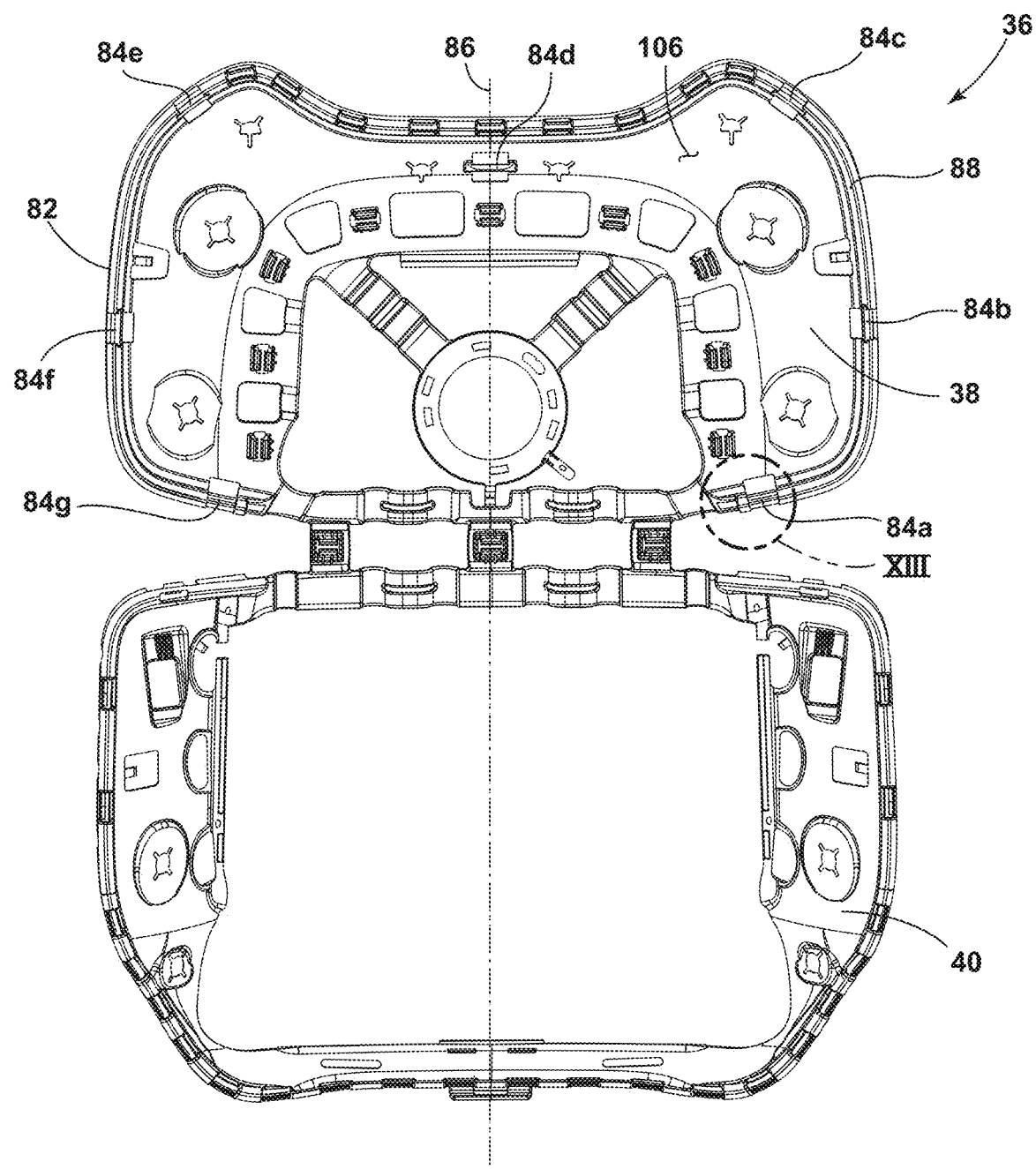
FIG. 10 is a front view of the carrier of FIG. 2, illustrating a plurality of snap-fit receivers arranged near an outer edge surface of the upper thoracic section.
Figure 11:
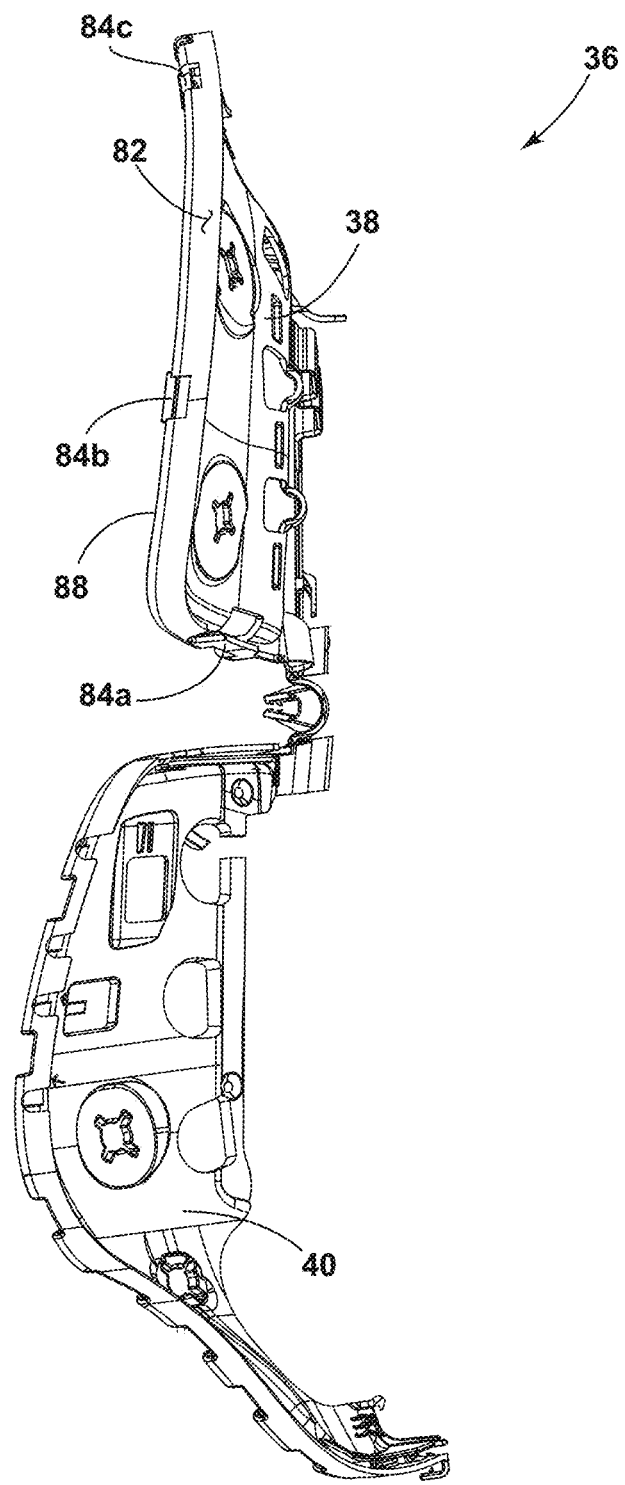
FIG. 11 is a side view of the carrier of FIG. 2, illustrating the plurality of snap-fit receivers arranged near the outer edge surface of the upper thoracic section.
Figure 12:
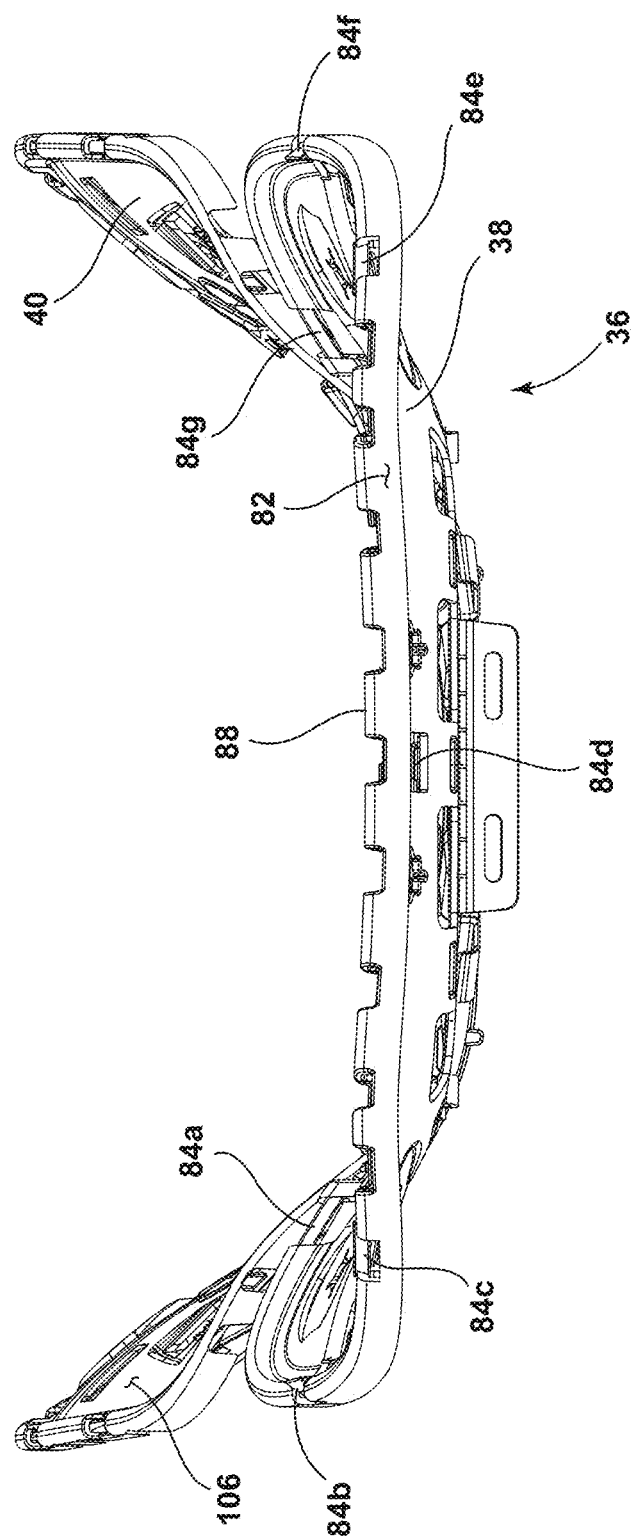
FIG. 12 is a top view of the carrier of FIG. 2, illustrating the plurality of snap-fit receivers arranged near the outer edge surface of the upper thoracic section.

Referring to FIG. 2, the seatback comfort assembly 20 includes a coverstock 32, a cushion assembly 34, and a carrier 36. The coverstock 32 is a fabric such as cloth, vinyl, or leather and provides the surface upon which the occupant sits. The coverstock 32 is attached to the carrier 36 and covers the cushion assembly 34. The carrier 36 provides structural support for the cushion assembly 34 and the coverstock 32. The carrier 36 has an upper thoracic section 38, which corresponds to the upper thoracic region 24 of the seatback comfort assembly 20, and a lower lumbar section 40, which corresponds to the lower lumbar region 26 of the seatback comfort assembly 20. The cushion assembly 34 includes a lower lumbar component 42, which corresponds to the lower lumbar region 26 of the seatback comfort assembly 20, and an upper thoracic component 44, which corresponds to the upper thoracic region 24 of the seatback comfort assembly 20. It should be understood, however, that the cushion assembly 34 can be one component rather than two separate components. The cushion assembly 34 is primarily molded foam. The cushion assembly 34 cushions the body of an occupant of the seating assembly 12. Although not illustrated, it should be understood that the seat comfort assembly 28 likewise includes a coverstock covering a cushion, which is attached to a carrier, which is further supported by the seat frame 30.

Referring to FIGS. 3-6, the upper thoracic component 44 of the cushion assembly 34 includes an outer edge 46 around the entire upper thoracic component 44. The upper thoracic component 44 further includes an occupant facing surface 48, which is the side of the upper thoracic component 44 that supports and faces an occupant sitting in the seating assembly 12. The upper thoracic component 44 further includes a carrier facing surface 50 opposite the occupant facing surface 48. The carrier facing surface 50 is the side of the upper thoracic component 44 that generally faces and abuts the carrier 36, when the upper thoracic component 44 is attached to the carrier 36. The upper thoracic component 44 further includes a lip 52 along the outer edge 46. The lip 52 extends generally rearward, that is, away from the occupant facing surface 48. The lip 52 is configured to at least partially surround the outer edge surface (discussed below) of the carrier 36, and thus help maintain the upper thoracic component 44 in place on the carrier 36 after attachment. In some embodiments of a cushion, a lip could be configured to entirely surround the outer edge surface of the carrier 36. The lip 52 includes an inward facing surface 54. The upper thoracic component 44 further includes a recess 56 in the carrier facing surface 50. The recess 56 runs parallel to the lip 52 and is adjacent to the lip 52. The recess 56 is contiguous with the inward facing surface 54 of the lip 52. In other words, the recess 56 transitions into the inward facing surface 54 of the lip 52. The recess 56 matches and receives a rib on the carrier 36, as discussed below, which further helps maintain the upper thoracic component 44 in place on the carrier 36 after attachment.

The upper thoracic component 44 includes a plurality of snap-fit fasteners 58*a-g*, including a first snap-fit fastener 58*a*, a second snap-fit fastener 58*b*, a third snap-fit fastener 58*c*, a fourth snap-fit fastener 58*d*, a fifth snap-fit fastener 58*e*, a sixth snap-fit fastener 58*f*, and a seventh snap-fit fastener 58*g*. The plurality of snap-fit fasteners 58*a-g* are arranged to interconnect with (e.g., fasten or attach to) a plurality of snap-fit receivers (discussed below) on the carrier 36. The plurality of snap-fit fasteners 58*a-g* are accessible for interconnection from the carrier facing surface 50. In other words, the plurality of snap-fit fasteners 58*a-g* are accessible from the rear of the upper thoracic component 44. Thus, the plurality of snap-fit fasteners 58*a-g* allow the carrier facing surface 50 to face and abut the carrier 36.

The snap-fit fasteners 58*a-g* are arranged so as to prevent the outer edge 46 from rolling up after the upper thoracic component 44 cushion is attached to the carrier 36. To prevent the outer edge 46 from rolling up, the snap-fit fasteners 58*a-g* are provided close to the outer edge 46 and numerous snap-fit fasteners 58*a-g* are utilized. In this embodiment of the upper thoracic component 44 of the cushion assembly 34, seven spaced apart snap-fit fasteners 58*a-g* are utilized. The upper thoracic component 44 further includes a midline 60. The midline 60 is an imaginary plane extending through the upper thoracic component 44 at least approximately orthogonally to both the occupant facing surface 48 and the carrier facing surface 50 of the upper thoracic component 44. The midline 60 conceptually divides the upper thoracic component 44 into two at least approximately symmetrical halves. One snap-fit fastener, snap-fit fastener 58*d*, is located at the midline 60 of the upper thoracic component 44. Three snap-fit fasteners, snap-fit fasteners 58*a-c*, are located to one side of the midline 60. Three snap-fit fasteners, snap-fit fasteners 58*e-g*, are located to the other side of the midline 60. A portion of the snap-fit fasteners 58*a-g*, snap-fit fasteners 58*a-c* and 58*e-g*, in this embodiment, are accessible for interconnection with the carrier 36 adjacent the lip 52. Because the lip 52 surrounds the carrier 36, the snap-fit fasteners 58*a-c*. 58*e-g* are positioned adjacent (close to) the lip 52 as close to the outer edge 46 as possible, which assists in preventing the outer edge 46 from rolling up. At least some of the plurality of snap-fit fasteners 58*a-g*, specifically snap-fit fasteners 58*a-c*. 58*e-g*, are arranged adjacent the recess 56 such that the base (discussed below) of the snap-fit fastener is disposed within the foam directly below the surface of the recess 56.

As in the illustrated embodiment, the lip 52 adjacent to at least some of the plurality of snap-fit fasteners 58*a-g* (that is, snap-fit fasteners 58*a-c*, 58*e-g*) extends further away (e.g., further rearward) from the recess 56 and the carrier facing surface 50 than the particular snap-fit fastener adjacent to the lip 52. For example, the lip 52 adjacent to the snap-fit fastener 58*a* extends further away from the recess 56 and the carrier facing surface 50 than a first cantilever 62*a* and a second cantilever 68*a* of the snap-fit fastener 58*a* (and so on for snap-fit fasteners 50*b*, 58*c*, and 58*e-g*). Further, as in the illustrated embodiment, the lip 52 and the recess 56 extend contiguously parallel to the midline 60 on each side of the midline 60 (i.e., near snap-fit fasteners 58*b* and 58*f*) across the midline 60 adjacent to the snap-fit fastener 58*d* that is disposed at the midline 60.

A cushion, such as the upper thoracic component 44, can interconnect with a structural support, such as carrier 36, and prevent the outer edge, such as outer edge 46, from rolling up by utilizing snap-fit fasteners that include only a first cantilever, such as first cantilever 62*a*. However, adding a second cantilever, such as second cantilever 68*a*, adds stability to the interconnection. The second cantilever 68*a* can be generally parallel to the first cantilever 62*a*, in that the first cantilever 62*a* and the second cantilever 68*a* both extend from a base 72*a* (discussed below) in the same direction. The second cantilever 68*a* also includes a catch flange 70*a*. The catch flange 70*a* of the second cantilever 68*a* serves the same function as a catch flange 64*a* of the first cantilever 62*a* in that the catch flange 70*a* meets an undercut or recessed area of the snap-fit receiver and is thereby held in place. The catch flange 70*a* of the second cantilever 68*a* extends toward the first cantilever 62*a* and the catch flange 64*a* of the first cantilever 62*a* extends toward the second cantilever 68*a*. In this manner, the first cantilever 62*a* and the second cantilever 68*a* are mirror images of each other.

Representative snap-fit fastener 58*a* further includes a base 72*a* that is perpendicular to and supports the first cantilever 62*a* and the second cantilever 68*a*. The base 72*a*, the first cantilever 62*a*, and the second cantilever 68*a* form a receiver channel 74*a*, within which a snap-fit receiver 84*a* (discussed below) of the carrier 36 can be held and maintained allowing for interconnection between the snap-fit fastener 58*a* and the snap-fit receiver 84*a*. The space between the catch flange 64*a* of the first cantilever 62*a* and the catch flange 70*a* of the second cantilever 68*a* forms an opening 76*a* into the receiver channel 74*a*. The base 72*a* further includes a first wing portion 78*a* and a second wing portion 80*a* opposite of the first wing portion 78*a*. At least the first wing portion 78*a* and the second wing portion 80*a* are disposed beneath the carrier facing surface 50. This can be achieved by foam molding the cushion, here the upper thoracic component 44, with the snap-fit fastener 58*a* properly positioned within the mold during the molding of the foam (along with all the other snap-fit fasteners 58*b-g*), such that the first wing portion 78*a* and the second wing portion 80*a* are molded over. The first wing portion 78*a* and the second wing portion 80*a* add stability and keep the snap-fit fastener 58*a* connected to the upper thoracic component 44 even when a pulling force is applied to the first cantilever 62*a* and the second cantilever 68*a*. The first cantilever 62*a* and the second cantilever 68*a* may be nearly entirely exposed (i.e., not molded over with foam) and extend away from the carrier facing surface 50 in a generally rearward direction. The first cantilever 62*a* and the second cantilever 68*a* may be partially molded over with foam, such that most of the first cantilever 62*a* and the second cantilever 68*a* are molded over with foam except for a receiver facing surface 66*a* of the first cantilever 62*a*, the equivalent receiver facing surface of the second cantilever 68*a*, all or most of the receiver channel 74*a*, and the portion of the catch flange 64*a* and the catch flange 70*a* facing downward toward the receiver channel 74*a*.

Representative snap-fit fastener 58*a* further includes a base 72*a* that is perpendicular to and supports the first cantilever 62*a* and the second cantilever 68*a*. The base 72*a*, the first cantilever 62*a*, and the second cantilever 68*a* form a receiver channel 74*a*, within which a snap-fit receiver 84*a* (discussed below) of the carrier 36 can be held and maintained allowing for interconnection between the snap-fit fastener 58a and the snap-fit receiver 84a. The receiver channel 74a is disposed between the first cantilever 62a and the second cantilever 68a. The receiver facing surface 66a of the first cantilever 62a faces the receiver channel 74a and defines a portion thereof. The space between the catch flange 64a of the first cantilever 62a and the catch flange 70a of the second cantilever 68a forms an opening 76a into the receiver channel 74a. The base 72a further includes a first wing portion 78a and a second wing portion 80a opposite of the first wing portion 78a. At least the first wing portion 78a and the second wing portion 80a are disposed beneath the carrier facing surface 50. This can be achieved by foam molding the cushion, here the upper thoracic component 44, with the snap-fit fastener 58a properly positioned within the mold during the molding of the foam (along with all the other snap-fit fasteners 58b-g), such that the first wing portion 78a and the second wing portion 80a are molded over. The first wing portion 78a and the second wing portion 80a add stability and keep the snap-fit fastener 58a connected to the upper thoracic component 44 even when a pulling force is applied to the first cantilever 62a and the second cantilever 68a. The first cantilever 62a and the second cantilever 68a may be nearly entirely exposed (i.e., not molded over with foam) and extend away from the carrier facing surface 50 in a generally rearward direction. The first cantilever 62a and the second cantilever 68a may be partially molded over with foam, such that most of the first cantilever 62a and the second cantilever 68a are molded over with foam except for the receiver facing surface 66a of the first cantilever 62a, the equivalent receiver facing surface of the second cantilever 68a, all or most of the receiver channel 74a, and the portion of the catch flange 64a and the catch flange 70a facing downward toward the receiver channel 74a. As in the illustrated embodiment (see e.g., FIG. 5), each of the plurality of snap-fit fasteners 58a-58g can be oriented such that the receiver facing surface 66 of each of the snap-fit fasteners 58a-58g is generally parallel to the inward facing surface 54 of the lip 52 and outer edge 46 adjacent to (i.e., the portion of the lip 52 and outer edge 46 closest to) the particular snap-fit fastener 58a-58g. In addition, as in the illustrated embodiment, each of the plurality of snap-fit fasteners 58a-58g can be oriented differently—that is, oriented such that none of the receiver facing surfaces 66 of the plurality of snap-fit fasteners 58a-58g are parallel to each other. In other words, the receiver facing surface 66 of the first cantilever 62 of each of the plurality of snap-fit fasteners 58a-58g faces in a different direction.

The carrier 36 further includes a midline 86 and a cushion facing surface 106. The midline 86 is an imaginary plane extending through the carrier 36 at least approximately orthogonally to the cushion facing surface 106. The midline 86 conceptually divides the carrier 36 into two at least approximately symmetrical halves. In this embodiment of the carrier 36, at least one of the plurality of snap-fit receivers 84a-g, namely snap-fit receiver 84d, is located at the midline 86. Further, at least three of the plurality of snap-fit receivers 84a-g, namely snap-fit receivers 84a-c, are located to one side of the midline 86. Likewise, at least three of the plurality of snap-fit receivers 84a-g, namely snap-fit receivers 84e-g, are located to the other side of the midline 86. Such an arrangement provides appropriate distribution of the plurality of snap-fit receivers 84a-g for adequate interconnection between the carrier 36 and the upper thoracic component 44 cushion.

The carrier 36 further includes a rib 88 and a cushion facing surface 106. The cushion facing surface 106, at the upper thoracic section 38, faces and abuts the carrier facing surface 50 of the upper thoracic component 44. The rib 88 projects generally forward, that is, out perpendicularly relative to the cushion facing surface 106. The rib 88 is contiguous with an outer edge surface 82. In other words, the outermost surface of the rib 88 is the outer edge surface 82. As mentioned above, the recess 56 of the upper thoracic component 44 matches and receives the rib 88. The recess 56 is the recess in which the rib 88 sits. That further helps maintain the upper thoracic component 44 in place on the upper thoracic section 38 of the carrier 36, when the upper thoracic component 44 is attached to the carrier 36. The first cantilever 62a-c, 62e-g and the second cantilever 68a-c, 68c-g of snap-fit fasteners 58a-c, 58e-g are positioned such that they are within the recess 56, slightly projected from the recess 56, and form the receiver channels 74a-c, 74e-g that are within the recess. Snap-fit receivers 84a-c, 84e-g, are contiguous with the rib 88 (i.e., they are arranged along the rib 88). Thus, not only do the recess 56 and the rib 88 mechanically cooperate, the snap-fit fasteners 58a-c, 58e-g located along the recess 56 interconnect with the snap-fit receivers 84a-c, 84e-g on the rib 88.

Figure 13:
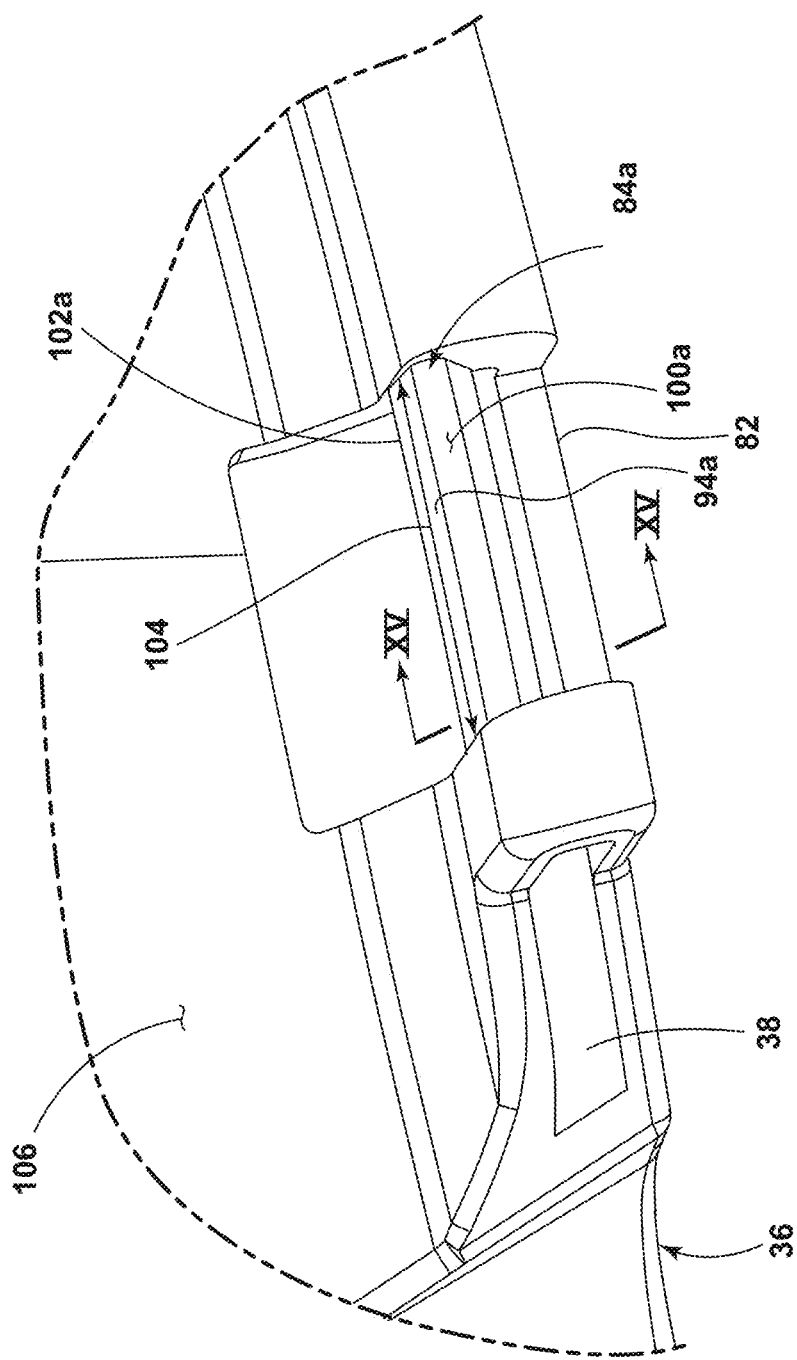
FIG. 13 is a front close up view of area XIII of FIG. 10, illustrating a representative snap-fit receiver in the form of an elongated beam with a crest.
Figure 14:
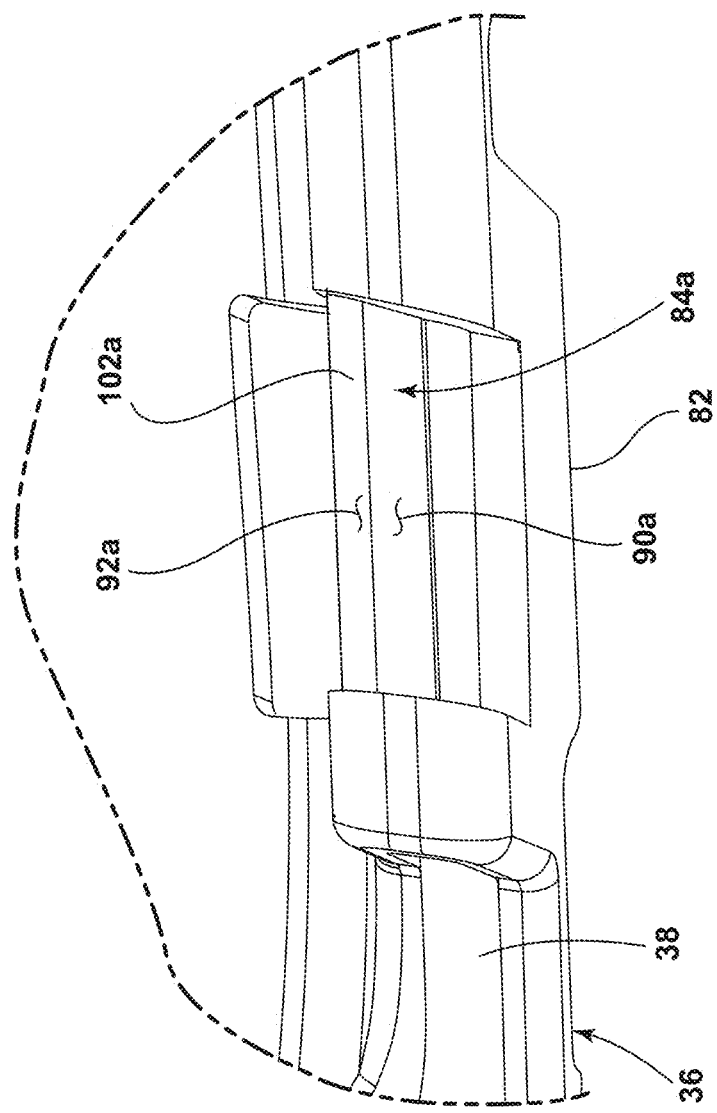
FIG. 14 is a rear close up view of area XIII of FIG. 10, illustrating the snap-fit receiver including a first catch receiving surface and a second catch receiving surface.
Figure 15:
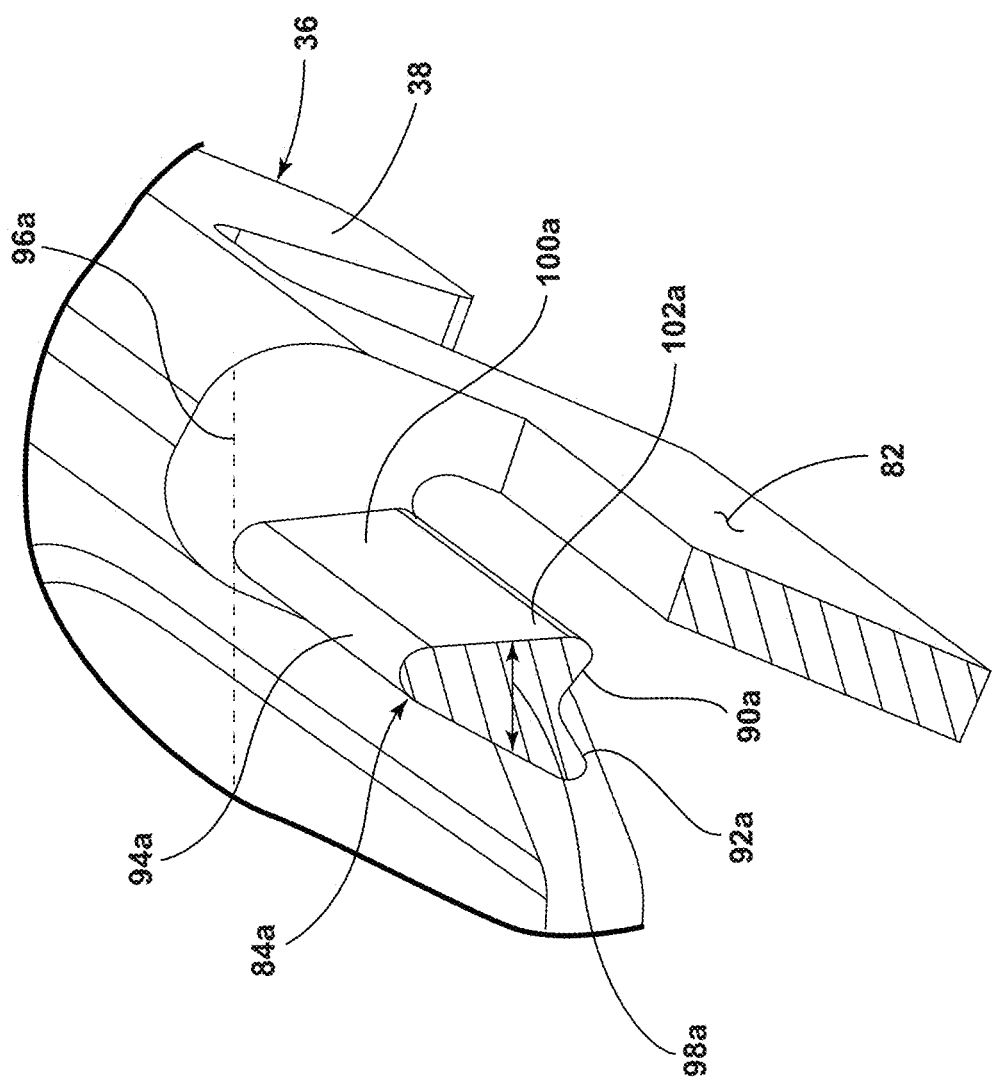
FIG. 15 is a perspective cross-sectional view taken through line XV-XV of FIG. 13, illustrating the snap-fit receiver with widening cross section from the crest to the first catch receiving surface.
Figure 16:
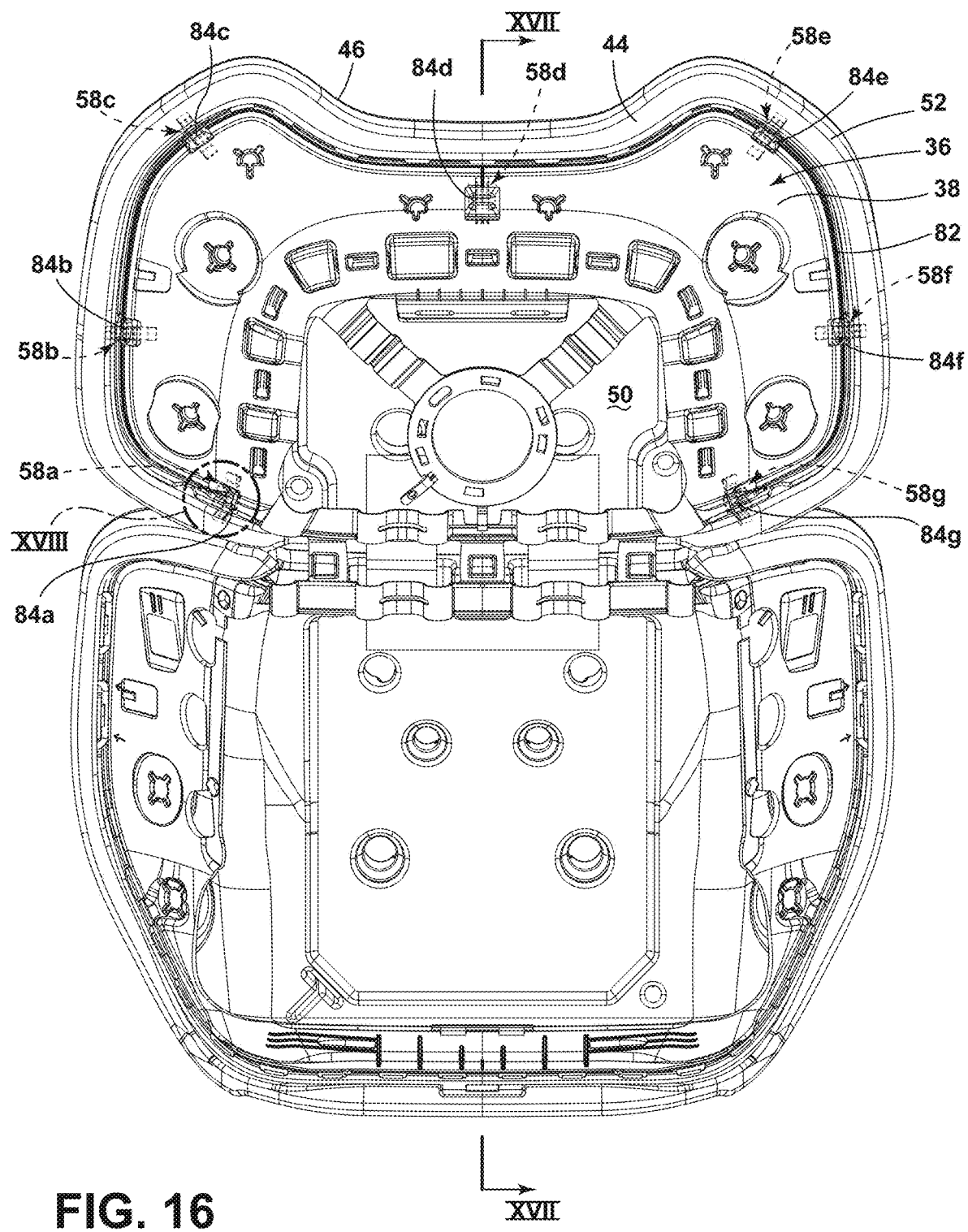
FIG. 16 is a rear view of the cushion assembly and the carrier of FIG. 2 attached to each other, illustrating the plurality of snap-fit fasteners interconnected with the plurality of snap-fit receivers.
Figure 17:
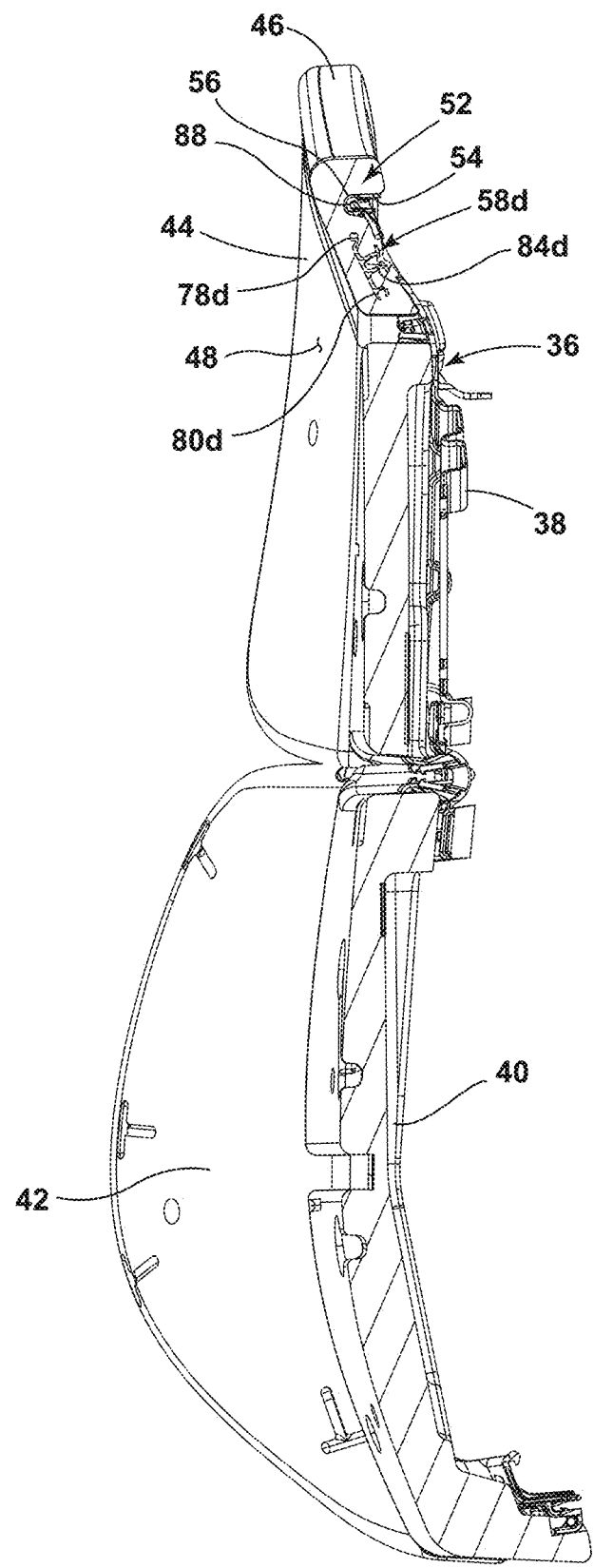
FIG. 17 is a cross-sectional view of the attached cushion assembly and carrier of FIG. 2 taken through line XVII-XVII of FIG. 16, illustrating the lip at least partially surrounding a rib of the carrier.
Figure 18:
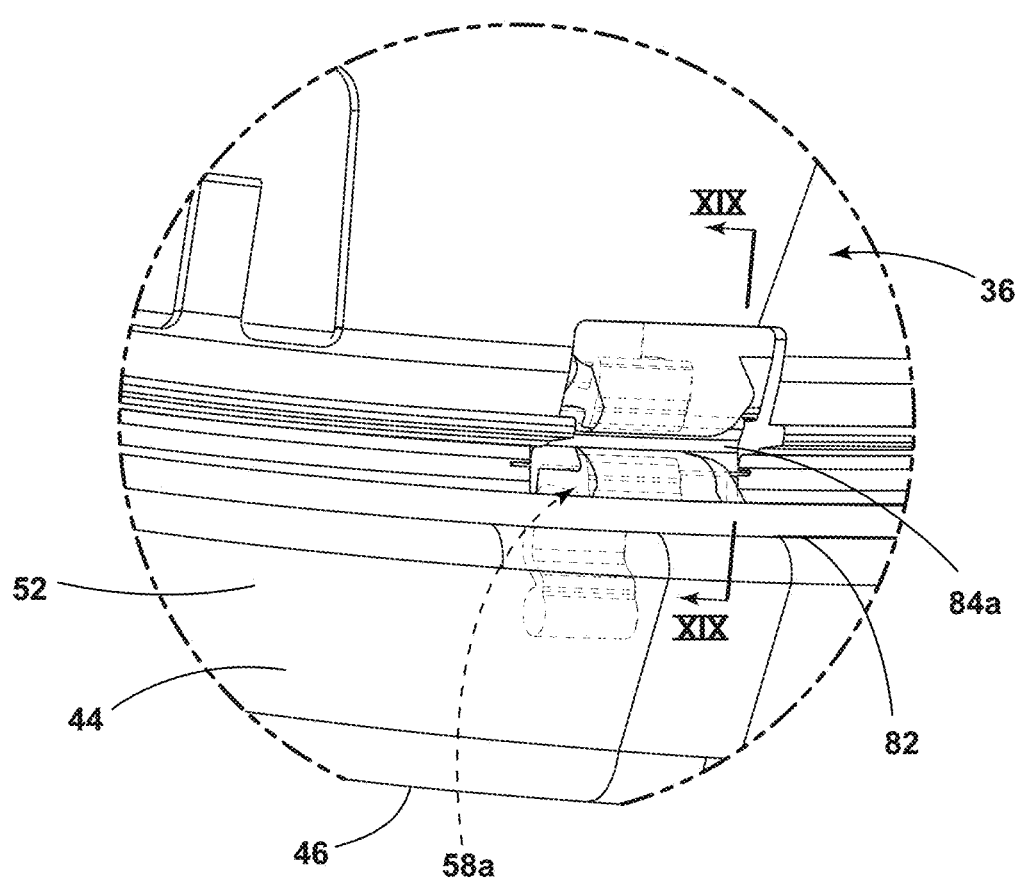
FIG. 18 is a rear close up view of area XVIII of FIG. 16, illustrating the snap-fit fastener of FIG. 7 interconnected with the snap-fit receiver of FIG. 13.
Figure 19:
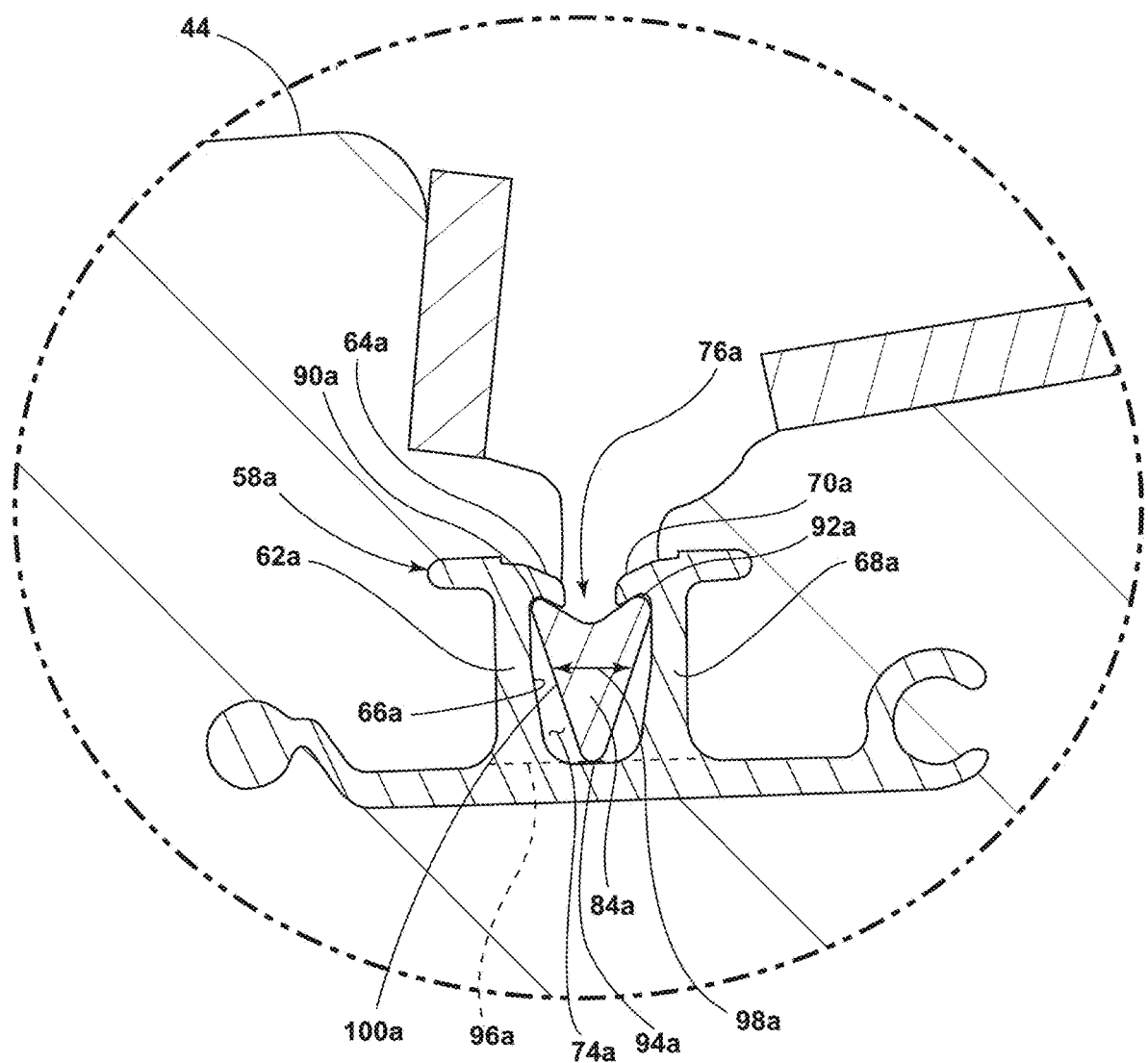
FIG. 19 is a perspective cross-sectional view taken through line XIX-XIX of FIG. 18, illustrating the snap-fit receiver of FIG. 13 held within the receiver channel of the snap-fit fastener of FIG. 7.

Referring now to FIGS. 13-15, each of the plurality of snap-fit receivers 84a-g are discussed. As each of the plurality of snap-fit receivers 84a-g include the same general features, snap-fit receiver 84a is discussed as representative of all snap-fit receivers 84a-g. Snap-fit receiver 84a includes a first catch receiving surface 90a. The first catch receiving surface 90a is adjacent the first catch flange 64a extending from the first cantilever 62a of snap-fit fastener 58a, when the upper thoracic component 44 cushion interconnects with the carrier 36. The first catch receiving surface 90a and the first catch flange 64a cooperate to prevent the snap-fit receiver 84a from disconnecting from the snap-fit fastener 58a after they become interconnected. Snap-fit receiver 84a can further include a second catch receiving surface 92a. The second catch receiving surface 92a is adjacent the catch flange 70a extending from the second cantilever 68a of the snap-fit fastener 58a when the upper thoracic component 44 interconnects with carrier 36. The second catch receiving surface 92a and the catch flange 70a cooperate to prevent the snap-fit receiver 84a from disconnecting from the snap-fit fastener 58a after they become interconnected. Although the snap-fit receiver 84a could employ only the first catch receiving surface 90a if snap-fit fastener 58a includes only the first cantilever 62a with catch flange 64a, as discussed above, it could be advantageous to include the opposing second cantilever 68a with catch flange 70a. In such a circumstance, the second catch receiving surface 92a would likewise be advantageous to interact with catch flange 70a of the second cantilever 68a.

Snap-fit receiver 84a further includes a crest 94a. As explained in greater detail below, snap-fit fastener 58a first interacts with snap-fit receiver 84a at the crest 94a as the crest 94a enters the receiver channel 74a. The crest 94a has a tangent line 96a. Snap-fit receiver 84a further comprises a cross-section width 98a that is parallel to the tangent line 96a. The cross-section width 98a widens between the crest 94a and the first catch receiving surface 90a. This widening cross-section width 98a, as explained in greater detail below, causes a cantilever deforming surface 100a to push the first cantilever 62a and the second cantilever 68a apart from each other as snap-fit receiver 84a goes through opening 76a and enters the receiver channel 74a.

Snap-fit receiver 84a can further include an elongated beam 102a. In other words, the cross-section of a snap-fit receiver 84a can have an entirely enclosed perimeter with no material impeding the shortest distance between the first catch receiving surface 90a and the second catch receiving surface 92a. In short, snap-fit receiver 84a can be circumnavigable around the cross-section thereof. The elongated beam 102a has a length 104a. The length 104a is generally parallel to the portion of the outer edge surface 82 to which the length 104a is closest.

Referring now to FIGS. 16-19, the upper thoracic component 44 cushion becomes interconnected with the upper thoracic section 38 of the carrier 36 by placing the carrier facing surface 50 of the upper thoracic component 44 onto the cushion facing surface 106 of the upper thoracic section 38 of the carrier 36. The crest 94a of snap-fit receiver 84a is moved toward and into the opening 76a between the catch flange 64a of the first cantilever 62a and the catch flange 70a of the second cantilever 68a of snap-fit fastener 58a. The cantilever deforming surface 100a of snap-fit receiver 84a increasingly deforms the first cantilever 62a and/or the second cantilever 68a as the cantilever deforming surface 100a progresses through the opening 76a and into the receiver channel 74a, because the cross-section width 98a parallel to the tangent line 96a of the crest 94a widens toward the first catch receiving surface 90a. The cantilever deforming surface 100a continues to deform the first cantilever 62a and/or the second cantilever 68a, and pushes them away from each other, until the catch flange 64a of the first cantilever 62a and the catch flange 70a of the second cantilever 68a snap over and settle adjacent to the first catch receiving surface 90a and second catch receiving surface 92a, respectively, of the snap-fit receiver 84a. This snapping provides audible and tactile feedback that snap-fit fastener 58a and the snap-fit receiver 84a have interconnected. The receiver facing surface 66a of the first cantilever 62a of snap-fit fastener 58a faces the cantilever deforming surface 100a of snap-fit receiver 84a. Snap-fit receiver 84a is now disposed within the receiver channel 74a of snap-fit fastener 58a. The remaining of the plurality of snap-fasteners 58b-g and plurality of snap-fit receivers 84b-g are interconnected in the same manner, providing the same audible and tactile feedback when they become interconnected.

Accordingly, the plurality of snap-fit receivers 84a-g have received, are retaining, and are interconnected with the plurality of snap-fit fasteners 58a-g. Thus, the upper thoracic component 44 of the cushion assembly 34 is interconnected with the upper thoracic section 38 of the carrier 36. The carrier facing surface 50 of the upper thoracic component 44 thus faces and abuts the cushion facing surface 106 of the upper thoracic section 38 of the carrier 36. The plurality of snap-fit fasteners 58a-g are interconnected with the plurality of snap-fit receivers 84a-g from the carrier facing surface 50. More specifically, the first snap-fit receiver 84a has received and is retaining the first snap-fit fastener 58a, the second snap-fit receiver 84b has received and is retaining the second snap-fit fastener 58b, the third snap-fit receiver 84c has received and is retaining the third snap-fit fastener 58c, the fourth snap-fit receiver 84d has received and is retaining the fourth snap-fit fastener 58d, the fifth snap-fit receiver 84e has received and is retaining the fifth snap-fit fastener 58e, the sixth snap-fit receiver 84f has received and is retaining the sixth snap-fit fastener 58f, and the seventh snap-fit receiver 84g has received and is retaining the seventh snap-fit fastener 58g. As the plurality of snap-fit receivers 84a-g are arranged close to the outer edge surface 82 and spaced apart, and the plurality of snap-fit fasteners 58a-g are arranged close to the outer edge 46 to accommodate the location of the plurality of snap-fit receiver 84a-g, the outer edge 46 of the upper thoracic component 44 cushion is prevented from rolling up.

The upper thoracic component 44 cushion at least partially surrounds carrier 36 such that at least a portion of the inward facing surface 54 of the lip 52 faces the outer edge surface 82 of the upper thoracic section 38 of the carrier 36. At least a portion of the snap-fit fasteners 58a-g, namely snap-fit fasteners 58a-c. 58e-g, are interconnected with a portion of the plurality of snap-fit receivers 84a-g, namely snap-fit receivers 84a-c, 84e-g, adjacent the lip 52. At least a portion of the rib 88 of the carrier 36 is seated within the recess 56 of the upper thoracic component 44 cushion. By partially encircling the upper thoracic section 38 of the carrier 36 in this manner, that is, using lip 52 to partially surround and encircle the outer edge surface 82 of upper thoracic section 38 and seating the rib 88 within the recess 56, the upper thoracic component 44 is more apt to stay on and interconnected with the carrier 36. By interconnecting snap-fit fasteners 58a-g and snap-fit receivers 84a-g adjacently, that is, close to, the lip 52, the outer edge 46 of the upper thoracic component 44 is less likely to roll up.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A carrier for a cushion of a seating assembly of a vehicle comprising:
    a midline;
    a cushion facing surface;
    a rib contiguous with the cushion facing surface projecting forward from the cushion facing surface, the rib having an outermost surface bounding the carrier, when viewed from a perspective of facing the cushion facing surface of the carrier, throughout a range of at least 180 degrees from one lateral side of the carrier, across the midline of the carrier, and to another lateral side of the carrier;
    a plurality of snap-fit receivers contiguous with the rib and insert into the rib, with an equal number of the plurality of snap-fit receivers disposed to each side of the midline of the carrier, wherein (a) each of the plurality of snap-fit receivers comprises an elongated beam with (i) a crest, (ii) a first catch receiving surface rearward of the crest, and (iii) a cross-section width that widens between the crest and the first catch receiving surface, (b) the crest of each of the plurality of snap-fit receivers is exposed when viewing the carrier from a front of the carrier, and (c) the first catch receiving surface of each of the plurality of snap-fit receivers is exposed when viewing the carrier from a rear of the carrier; and
    an additional snap-fit receiver disposed at the midline of the carrier.

2. A carrier for a cushion of a seatback comfort assembly of a vehicle comprising:
    a cushion facing surface;
    a rib contiguous with and projecting forward from the cushion facing surface, the rib having an outermost surface bounding the carrier, when viewed from a perspective of facing the cushion facing surface of the carrier, throughout a range of at least 180 degrees from one lateral side of the carrier, across a midline of the carrier, and to another lateral side of the carrier; and
    a plurality of snap-fit receivers arranged along and contiguous with the rib, each of the plurality of snap-fit receivers comprising an elongated beam with (i) a crest, (ii) a first catch receiving surface rearward of the crest, and (iii) a cross-section width that widens between the crest and the first catch receiving surface.

3. The carrier of claim 2, wherein the plurality of snap-fit receivers arranged along the rib are inset into the rib.

4. The carrier of claim 2 further comprising:
another snap-fit receiver, which is located at the midline.

5. The carrier of claim 2, wherein
at least three of the plurality of snap-fit receivers are located to one side of the midline; and
at least three of the plurality of snap-fit receivers are located to another side of the midline.

6. The carrier of claim 5 further comprising:
another snap-fit receiver, which is located at the midline.

7. The carrier of claim 2, wherein
the elongated beam of each of the plurality of snap-fit receivers further includes a second catch receiving surface rearward if the crest; and
the second catch receiving surface forms an angle of less than 180 degrees with the first catch receiving surface.

8. The carrier of claim 7, wherein, the elongated beam has a shape with a circumnavigable cross-section.

9. The carrier of claim 7, wherein
the crest of each of the plurality of snap-fit receivers is exposed when viewing the carrier from a front of the carrier;
the first catch receiving surface of each of the plurality of snap-fit receivers is exposed when viewing the carrier from a rear of the carrier; and
the second catch receiving surface of each of the plurality of snap-fit receivers is exposed when viewing the carrier from the rear of the carrier.

10. The carrier of claim 2, wherein, the elongated beam has a shape with a circumnavigable cross-section.

11. The carrier of claim 10, wherein
the elongated beam has a length that is parallel to the outermost surface of the rib.

12. The carrier of claim 2, wherein
the plurality of snap-fit receivers arranged along the rib project forward past the rib.

13. The carrier of claim 2, wherein
the crest of each of the plurality of snap-fir receivers is exposed when viewing the carrier from a front of the carrier; and
the first catch receiving surface of each of the plurality of snap-fit receivers is exposed when viewing the carrier from a rear of the carrier.

14. The carrier of claim 2 further comprising:
an upper thoracic section and a lower lumbar section;
wherein, the cushion facing surface, the rib, and the plurality of snap-fit receivers are disposed at the upper thoracic section.

15. A carrier for a cushion of a seating assembly of a vehicle comprising:
a cushion facing surface;
a rib contiguous with and extending forward from the cushion facing surface, the rib comprising an outermost surface that bounds the carrier when viewed from a perspective of facing the cushion facing surface of the carrier; and
a plurality of snap-fit receivers inset into and contiguous with the rib, each of the plurality of snap-fit receivers further including an elongated beam having a shape with a circumnavigable cross-section, the elongated beam including a crest that projects past the rib, a first catch receiving surface, and a cross-section width that widens between the crest and the first catch receiving surface.

16. The carrier of claim 15, wherein
the elongated beam of each of the plurality of snap-fit receivers further includes a second catch receiving surface rearward of the crest; and
the second catch receiving surface forms an angle of less than 180 degrees with the first catch receiving surface.

17. The carrier of claim 16, wherein
the crest of each of the plurality of snap-fit receivers is exposed when viewing the carrier from a front of the carrier; and
the first catch receiving surface and the second catch receiving surface of each of the plurality of snap-fit receivers is exposed when viewing the carrier from a rear of the carrier.

18. The carrier of claim 15 further comprising:
an upper thoracic section and a lower lumbar section;
wherein, the cushion facing surface, the rib, and the plurality of snap-fit receivers are disposed at the upper thoracic section.

19. The carrier of claim 15 further comprising:
a midline;
wherein, at least three of the plurality of snap-fit receivers are located to one side of the midline; and
wherein, at least three of the plurality of snap-fit receivers are located to another side of the midline.

20. The carrier of claim 15, wherein
the crest of each of the plurality of snap-fit receivers is exposed when viewing the carrier from a front of the carrier; and
the first catch receiving surface of each of the plurality of snap-fit receivers is exposed when viewing the carrier from a rear of the carrier.

* * * * *